(12) United States Patent
Matsuzaki

(10) Patent No.: US 12,336,446 B2
(45) Date of Patent: Jun. 24, 2025

(54) WORK VEHICLE SPECIFICATION CHANGE SYSTEM, WORK VEHICLE SPECIFICATION CHANGE METHOD, AND WORK VEHICLE SPECIFICATION CHANGE PROGRAM

(71) Applicant: KUBOTA CORPORATION, Osaka (JP)

(72) Inventor: Yushi Matsuzaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 190 days.

(21) Appl. No.: 18/008,458

(22) PCT Filed: May 19, 2021

(86) PCT No.: PCT/JP2021/018896
§ 371 (c)(1),
(2) Date: Dec. 6, 2022

(87) PCT Pub. No.: WO2022/014146
PCT Pub. Date: Jan. 20, 2022

(65) Prior Publication Data
US 2023/0200285 A1    Jun. 29, 2023

(30) Foreign Application Priority Data
Jul. 16, 2020    (JP) .................................. 2020-121954

(51) Int. Cl.
*A01B 71/02* (2006.01)
*G07C 5/02* (2006.01)

(52) U.S. Cl.
CPC ............... *A01B 71/02* (2013.01); *G07C 5/02* (2013.01)

(58) Field of Classification Search
CPC ......... A01B 71/02; G07C 5/02; E02F 9/2012; E02F 9/264; G06F 40/20; G06F 40/56;
(Continued)

(56) References Cited

U.S. PATENT DOCUMENTS

2007/0276549 A1* 11/2007 Hijikata .............. B60W 30/182
                                                      701/1
2013/0317745 A1* 11/2013 Sano .................. G01C 21/3682
                                                    701/533

(Continued)

FOREIGN PATENT DOCUMENTS

JP      2002-21121 A    1/2002
JP      2004-270368 A   9/2004
(Continued)

OTHER PUBLICATIONS

Official Communication issued in corresponding Japanese Patent Application No. 2020-121954, mailed on Nov. 14, 2023.
(Continued)

*Primary Examiner* — Yufeng Zhang
(74) *Attorney, Agent, or Firm* — Keating & Bennett, LLP

(57) ABSTRACT

A work vehicle specification change system includes an information input to receive a specification change request in a free text format to change a specification of an in-vehicle device of a work vehicle, the specification change request being sent from an operation device on which an input operation is performed by a user driving the work vehicle, a specification update information generator to generate specification update information, based on the specification change request in a free text format, and an information output to transmit the specification update information to the work vehicle.

13 Claims, 8 Drawing Sheets

(58) Field of Classification Search
CPC ........ G06F 8/65; G06Q 10/063; G06Q 50/04; G06Q 50/02; G06Q 50/08; H04L 67/34
See application file for complete search history.

(56) References Cited

U.S. PATENT DOCUMENTS

| | | |
|---|---|---|
| 2018/0074811 A1* | 3/2018 | Kiyama .................. H04L 67/12 |
| 2019/0266908 A1* | 8/2019 | Tsuchiya .................. G09B 7/00 |
| 2019/0283761 A1* | 9/2019 | Bielby ...................... G06F 8/65 |
| 2020/0173149 A1 | 6/2020 | Nishi |
| 2020/0247343 A1 | 8/2020 | Ichinose et al. |

FOREIGN PATENT DOCUMENTS

| | | |
|---|---|---|
| JP | 5794309 B2 | 10/2015 |
| JP | 2016-000570 A | 1/2016 |
| JP | 2019-089520 A | 6/2019 |
| JP | 2020-086320 A | 6/2020 |
| WO | 2019/035427 A1 | 2/2019 |

OTHER PUBLICATIONS

Official Communication issued in International Patent Application No. PCT/JP2021/018896, mailed on Jul. 27, 2021.

* cited by examiner

WORK VEHICLE SPECIFICATION CHANGE SYSTEM, WORK VEHICLE SPECIFICATION CHANGE METHOD, AND WORK VEHICLE SPECIFICATION CHANGE PROGRAM

BACKGROUND OF THE INVENTION

1. Field of the Invention

The present invention relates to a work vehicle specification change system, a work vehicle specification change method, and a work vehicle specification change program for changing a specification of an in-vehicle device of a work vehicle.

2. Description of the Related Art

JP 2004-270368A discloses a backhoe that uses left and right control levers to operate hydraulically actuated equipment such as a turning hydraulic motor, a boom hydraulic cylinder, an arm hydraulic cylinder, and a bucket hydraulic cylinder. The control levers can be operated in the left-right direction and the front-rear direction, and one of the pieces of the hydraulically actuated equipment can be operated by operating one of the control levers in one of the operating directions. The correspondence between each of the operating directions of the control levers and each of the pieces of the hydraulically actuated equipment is determined by an operation pattern. A plurality of operation patterns are provided in advance, and which hydraulically actuated equipment is to be assigned to each of the operating directions can be determined by selecting one operation pattern from the plurality of operation patterns. The selection (an example of a specification change) of the operation pattern is performed via an operation pattern switching switch operated by the user.

JP 2016-000570A discloses a control specification change system for changing a control specification of a vehicle. In response to a driver operating an operation unit of the vehicle in order to provide an instruction to change a control specification, the control specification change system causes specification changing data to be transmitted from a server, using a portable terminal of the driver serving as a relay device. A specification change processing unit of the control specification change system changes the control specification of the vehicle, using the transmitted specification changing data.

Japanese Patent No. 5794309 disclose a technique by which the ability of a driver is objectively measured, and a user interface that is installed in a vehicle is customized according to the ability of the driver.

SUMMARY OF THE INVENTION

In the case of the backhoe disclosed in JP 2004-270368A, as a result of the operator operating the operation pattern switching switch, a pattern instruction signal is output, and a controller selects one operation pattern from the operation patterns accordingly. Based on the selected operation pattern, drive signals are generated according to operation signals from the left and right swinging control levers. The drive signals are supplied to solenoid valves for the corresponding pieces of hydraulic equipment. With this configuration, the operator has to go through a process of trial and error before obtaining the desired relationship between the swinging direction (operating direction) of each of the control levers and the corresponding hydraulic equipment, unless the operator understands the operation patterns assigned to the switch positions of the operation pattern switching switch. The relationship between the swinging direction of each of the control levers and the corresponding hydraulic equipment is simply changed according to the preset patterns by operating the operation pattern switching switch. The relationship between the swinging direction of each of the control levers and each of the pieces of hydraulic equipment cannot be set freely, and it is difficult to make a change to achieve an operation feeling that matches a personal impression perceived by the operator.

In the case of the control specification change system disclosed in 2016-000570A, the driver uses the portable terminal to send a specification change command to a remotely located server, as a result of which the specification changing data generated by the server is downloaded to a control device of the vehicle, and the specification of the vehicle is changed. The driver merely sends the specification change command to the server, and the server will not be informed of the content of the specification change that the driver desires. Therefore, it is difficult to change the specification of the vehicle so as to match a feeling of the driver.

In the case of the vehicle interface change system disclosed in Japanese Patent No. 5794309, the control system of the vehicle objectively measures the driver's ability, and the vehicle interface is changed based on the objective measured value. Therefore, the change does not necessarily reflect the driver's own request.

Preferred embodiments of the present invention change a specification of a work vehicle so as to match a feeling of the driver as closely as possible.

A work vehicle specification change system according to a preferred embodiment of the present invention includes an information input to receive a specification change request in a free text format to change a specification of an in-vehicle device of a work vehicle, the specification change request being sent from an operation device on which an input operation is performed by a user driving the work vehicle, a specification update information generator to generate specification update information, based on the specification change request, and an information output to transmit the specification update information to the work vehicle.

With this configuration, if a driver of the work vehicle has a sense of incongruity with the traveling state or the work state, the driver uses the operation device to create a specification change request described in a free text format that includes either or both of the sense of incongruity and a proposal to eliminate the sense of incongruity, and the operation device sends the specification change request to the information input of the work vehicle specification change system. The specification change request described in a free text format may include ambiguous terms or phrases, undetermined terms or phrases, colloquial terms or phrases, dialects, and so forth. Based on the specification change request in a free text format received by the information input, the work vehicle specification change system generates specification update information to eliminate the driver's sense of incongruity with the traveling state or the work state, and sends the specification update information to the work vehicle. On the work vehicle side, the specification of the work vehicle is changed based on the specification update information. The operation device may be an operation device on which the user can selectively perform a formatted input operation. For example, the user may input an impression or a request regarding the behavior or the operability of the vehicle by selecting a formatted item.

Then, the operation device creates a specification change request described in a free text format from the input result. As long as the specification change request that is finally sent to the information input unit is described in a free text format, the mode of operation in which the user inputs the proposal is not limited. The content of the specification change request may be simply a list of results of formatted input, or may be a sentence in a free text format such as a sentence of colloquial words (a sentence that is input in an unformatted form). Since the specification change request created by the operation device based on an input operation performed by the driver (user) is in a free text format, the specification change request may be expressed using, for example, a list of words, a colloquial language, sensuous terms or phrases or, and the like, or may be the input content itself regardless of whether the content is input in a formatted form or an unformatted form. Therefore, a sense of incongruity felt during working travel, or a proposal for eliminating the sense of incongruity is expressed with straightforward words of the driver. Accordingly, the work vehicle after specification change can perform working travel that does not cause a sense of incongruity.

The work vehicle is subject to design limitations imposed by taking a safety factor into consideration and a specification change that exceeds the limitations is prohibited. In addition, the work vehicle may travel on a public road, and must obey prohibitions prescribed by the national and local governments. Therefore, the specification change limitation needs to be set based on such limitations and prohibitions, and the specification change limitation needs to be taken into account when generating specification update information. For this reason, in a preferred embodiment of the present invention, the work vehicle specification change system further includes a specification change limitation manager to manage a specification change limitation indicating limitation on specification change of the in-vehicle device, wherein the specification update information generator is configured or programmed to generate the specification update information, using the specification change limitation as a limitation. Since the laws and regulations prescribed by the local or national governments can be revised at any time as needed, it is preferable that each of the prohibitions based on laws and regulations is automatically updated and managed for each country or each region.

In order to generate specification update information from a specification change request in a free text format, it is necessary to accurately understand a sense of incongruity with the traveling state or the work state and a proposal to eliminate the sense of incongruity that are included in the specification change request. In particular, if, when the driver has created a specification change request using a colloquial language rather than accurate technical terms or phrases (words described in an instruction manual or specification data), the specification change request that has been sent needs to be converted into an appropriate specification change request that uses accurate technical terms or phrases, in order to generate an appropriate specification update information. As a result of the driver's sense of incongruity with working travel being read from the appropriate specification change request, specification change feature data to eliminate the sense of incongruity is created. The specification change feature data is data to derive a specification update parameter group that is a collection of control data necessary to update the specification of a work vehicle that is to be subjected to specification update. The specification update parameter group includes, for example, data to change a conversion table to convert an operation input into a control output, and data to change interfaces of various pieces of equipment installed in the work vehicle.

One configuration to generate the specification update information from the specification change request in a free text format is a configuration in which the ability of an expert who is proficient in specification change is utilized. That is, the ability of such an expert is best suited for an operation of reading the specification change request, understanding the meanings of the described terms or phrases, and creating the specification change feature data. The reason for this is that the expert can compare commonly used terms or phrases (including a colloquial language and easily confused terms or phrases) with accurate technical terms or phrases, express the specification change request with accurate technical terms or phrases, and find a specification change example including the terms or phrases read out from the specification change request. For this reason, in a preferred embodiment of the present invention, the work vehicle specification change system further includes a specification change request processor to create specification change feature data, using a feature term or a phrase selected from the specification change request by an expert, wherein the specification update information generator is configured or programmed to generate the specification update information, based on the specification change feature data.

When a comparison dictionary in which general terms or phrases and accurate technical terms or phrases are compared, and a collection of specification change examples in which many specification change examples linked to technical terms or phrases are collected have been compiled into a database, anyone other than an expert who is particularly proficient in specification change of the work vehicle can generate the specification update information from the specification change request in a free text format. For this reason, in a preferred embodiment of the present invention, the work vehicle specification change system further includes a term or a phrase database including a request term or phrase used in the specification change request and the feature terms or phrase used in the specification change feature data that are associated with each other, wherein the feature is selected from the specification change request with reference to the term or phrase database.

Another configuration to generate the specification update information from the specification change request in a free text format is an automated configuration that uses artificial intelligence technology such as a machine learning model, with substantially no manual operation required. For this reason, in a preferred embodiment of the present invention, the work vehicle specification change system further includes a specification change request processor to generate specification change feature data from the specification change request, wherein the specification update information generator is configured or programmed to generate the specification update information, based on the specification change feature data.

A specification change request using technical terms or phrases is generated, for example, by analyzing the content of a specification change request in a free text format, using a text analysis technique or a natural language processing technique, extracting important terms or phrases, and replacing the extracted important terms or phrases with technical terms or phrases. With the use of the specification change request using technical terms or phrases, it is possible to generate appropriate specification change feature data. For this reason, in a preferred embodiment of the present invention, the specification change request processor is configured or programmed to include a natural language processing module that has been machine-learned to output the specification change feature data in response to the specification change request being input. At this time, it is further convenient to use a relation extraction technique to extract relations between important terms or phrases for the machine learning model.

Furthermore, when the specification change feature data that is output by the specification change request processor is suitable for input data of a machine learning model that uses a neural network such as deep learning, it is possible to output the specification update parameter directly from the specification change feature data. For this reason, in a preferred embodiment of the present invention, the specification update information generator is configured or programmed to include a specification update parameter generation module that has been machine-learned to output a specification update parameter serving as the specification update information in response to the specification change feature data being input.

In the case where the specification change request that is sent from the driver of the work vehicle includes specification change of operations of various pieces of control equipment installed in a tractor, specification change (mode change) of interfaces of the pieces of control equipment, and the like, changeable portion of specifications are diversified. Therefore, changeable portions of specifications need to be classified for management in order to generate specification update information from the specification change request in a prompt and accurate manner. For this reason, in a preferred embodiment of the present invention, the work vehicle specification change system further includes a specification information manager to manage segmented specification data obtained by segmenting the changeable portion of specification of the in-vehicle device, wherein the segmented specification data of the in-vehicle device that is to be subjected to specification update is used to generate the specification change feature data.

The specification desired by a user who is a driver of the work vehicle may frequently change depending on the work content, or the state of the mind at any given time. To put it conversely, the same specification is desired for the same work content, or the same state of mind. Therefore, it is also possible to statistically estimate the content of the current specification change from the content of the specification change of the same user in the past. For this reason, in a preferred embodiment of the present invention, the work vehicle specification change system further includes a specification update history database to store a specification update history of the user, wherein the specification update history of the user that has been extracted from the specification update history database is used to generate the specification change feature data.

When the specification update information that is sent to the work vehicle an update program to execute a specification update, the specification of the in-vehicle device of the work vehicle is changed promptly. The update program can be generated once a specification update parameter (specification update parameter group) necessary for specification update has been obtained. For this reason, in a preferred embodiment of the present invention, the specification update information generator is configured or programmed to: based on the specification change feature data, generate a specification update parameter group for defining a specification update, and generate, from the specification update parameter group, an update program to changing the specification of the in-vehicle device as the specification update information.

Movement of the operation tool operated by the operation of the user changes the operation of each operating equipment installed in the work vehicle. The relationship between the movement of the operation tool and the operation of the operating equipment affects an operation feeling of the driver, and therefore one object of specification change is to change the relationship. It is convenient for the specification change to create an operation pattern suited to the driver's preference, an operation pattern defined for each work, and an operation pattern defined for each country or each region. For this reason, in a preferred embodiment of the present invention, the in-vehicle device includes an operation tool to be operated by a user, and an equipment operation device including an equipment controller to, based on an operation signal generated through operation of the operation tool, generate a control signal to control equipment of the work vehicle, and the operation of the operation tool and the control signal generated by the equipment controller are associated with each other by an operation pattern, and the operation pattern is changeable with the specification update information.

The overall cost of the work vehicle specification change system is reduced when the work vehicle specification change system is used by a large number of work vehicles. For this reason, as a preferred embodiment of the present invention, it is preferable that the specification update information generator is included in a cloud computing system capable of data communication with either or both of a controller of the work vehicle and a portable terminal of the user.

Preferred embodiments of the present invention are intended not only for work vehicle specification change systems, but also for work vehicle specification change methods used in work vehicle specification change systems. A work vehicle specification change method according to a preferred embodiment of the present invention includes an information input step of receiving a specification change request in a free text format to change a specification of an in-vehicle device of a work vehicle, the specification change request being sent from an operation device on which an input operation is performed by a user driving the work vehicle, a specification update information generation step of generating specification update information, based on the specification change request in a free text format, and an information output step of transmitting the specification update information to the work vehicle. The operation and effects, as well as preferred embodiments of the work vehicle specification change systems described above are also applicable to the work vehicle specification change methods according to preferred embodiments of the present invention.

The preferred embodiments of the present invention are intended not only for work vehicle specification change systems, but also for work vehicle specification change programs stored on non-transitory computer-readable media. A non-transitory computer-readable medium according to a preferred embodiment of the present invention including a work vehicle specification change program to cause a computer to execute an information input step of receiving a specification change request in a free text format to change a specification of an in-vehicle device of a work vehicle, the specification change request being sent from an operation device on which an input operation is performed by a user driving the work vehicle, a specification update information generation step of generating specification update information, based on the specification change request in a free text format, and an information output step of transmitting the specification update information to the work vehicle. The operations and effects, as well as preferred embodiments of the work vehicle specification change systems described above are also applicable to the work vehicle specification change programs stored on non-transitory computer-readable media according to preferred embodiments of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
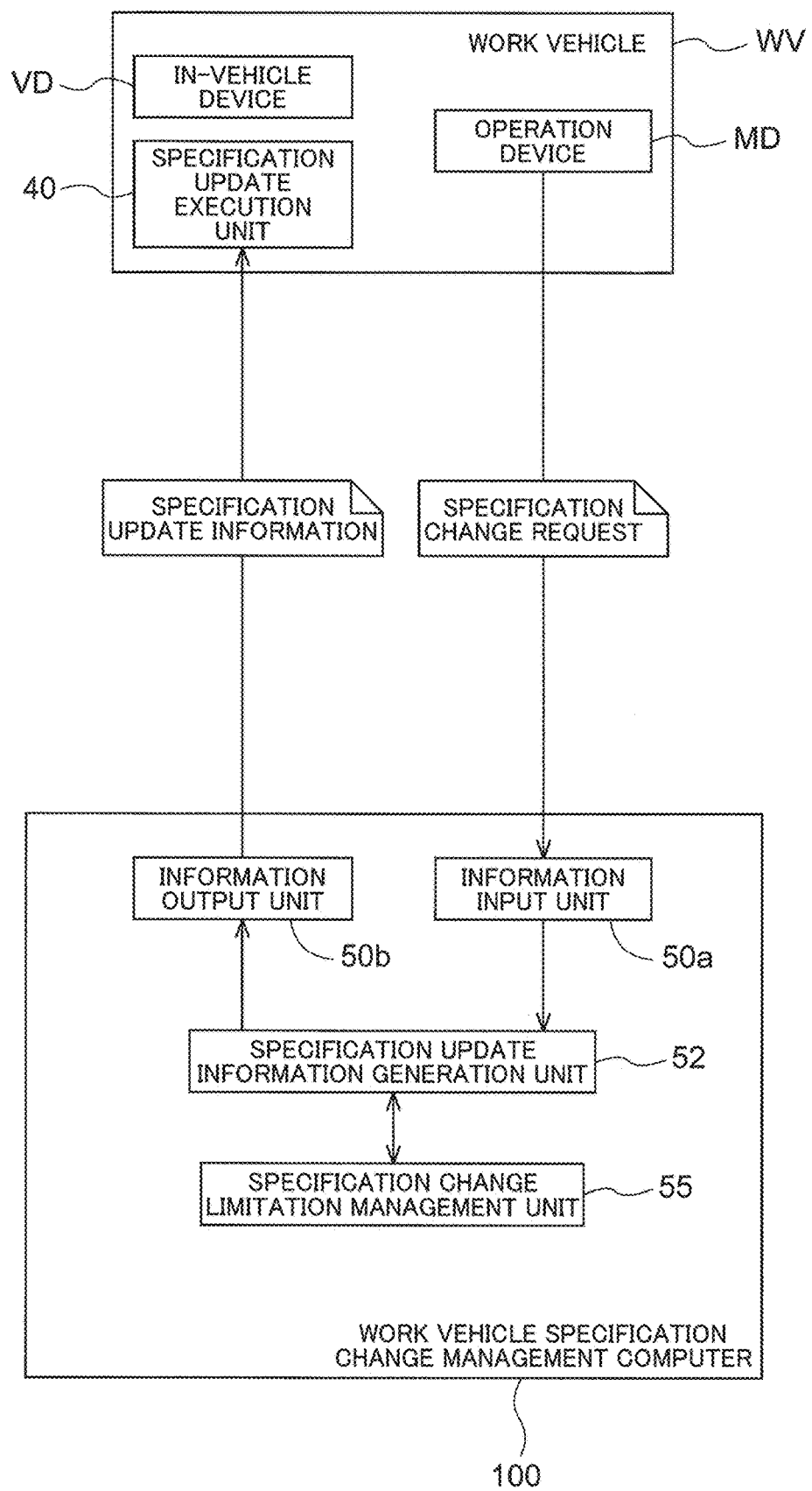
FIG. 1 is a schematic diagram showing a basic configuration of a work vehicle specification change system.

FIG. 1 shows a basic configuration diagram of a preferred embodiment of the work vehicle specification change system according to the present invention. A driver feeling a sense of incongruity with the traveling state or the work state of a work vehicle WV operates an operation device MD, whereby a specification change request in a free text format to change a specification of an in-vehicle device VD of the work vehicle WV is created. The specification change request in a free text format is a specification change instruction created based on a sense of incongruity felt by the driver during working travel of the work vehicle WV. For example, the specification change request described in a free text format includes details, including, for example, operating characteristics of the work vehicle WV such as "the response of the turning operation is slow", "the acceleration of the vehicle body is poor", "the maximum number of revolutions of the engine needs to be reduced", and "the maximum vehicle speed needs to be reduced", characteristics of a work device such as "the elevation control sensitivity of the work device need to be reduced", notification specifications such as "to change the condition for generating a warning display (e.g., advancing a warning timing for fuel exhaustion, and advancing a warning timing for DPF reproduction)", UI (user interface) and HMI (human interface) design matters such as "the display on a meter panel is difficult to view", and "the size of characters on a touch panel is small", the relationship between an operation member or an operation input and an actuator such as "a work unit needs to be lifted and lowered by operating a control lever to swing in a longitudinal direction", and improvement requests from the driver such as "the engine sound is too loud".

The specification change request is transmitted from the operation device MD via a data communication network to an information input unit 50a of a work vehicle specification change management computer 100 in which the work vehicle specification change system is constructed. The specification change request received by the information input unit 50a is supplied to a specification update information generation unit 52. The specification update information generation unit 52 generates specification update information, based on the specification change request. The specification update information is information (program) to change specifications a specific control system of the work vehicle WV so as to satisfy the driver's request indicated in the specification change request. However, this specification change is limited due to, for example, design limitations imposed taking a safety factor into account, and prohibitions prescribed by the national and local governments. Such a limitation that limits the specification change of the work vehicle WV is managed by a specification change limitation management unit 55. Accordingly, the specification update information generation unit 52 takes the specification change limitation into account when generating the specification update information. The specification update information generated by the specification update information generation unit 52 is transmitted to the control system of the work vehicle WV from an information output unit 50b via a data communication network. The control system of the work vehicle WV performs a specification update based on the received specification update information.

The preferred embodiment of the work vehicle specification change system described above will be described below in detail.

Figure 2:
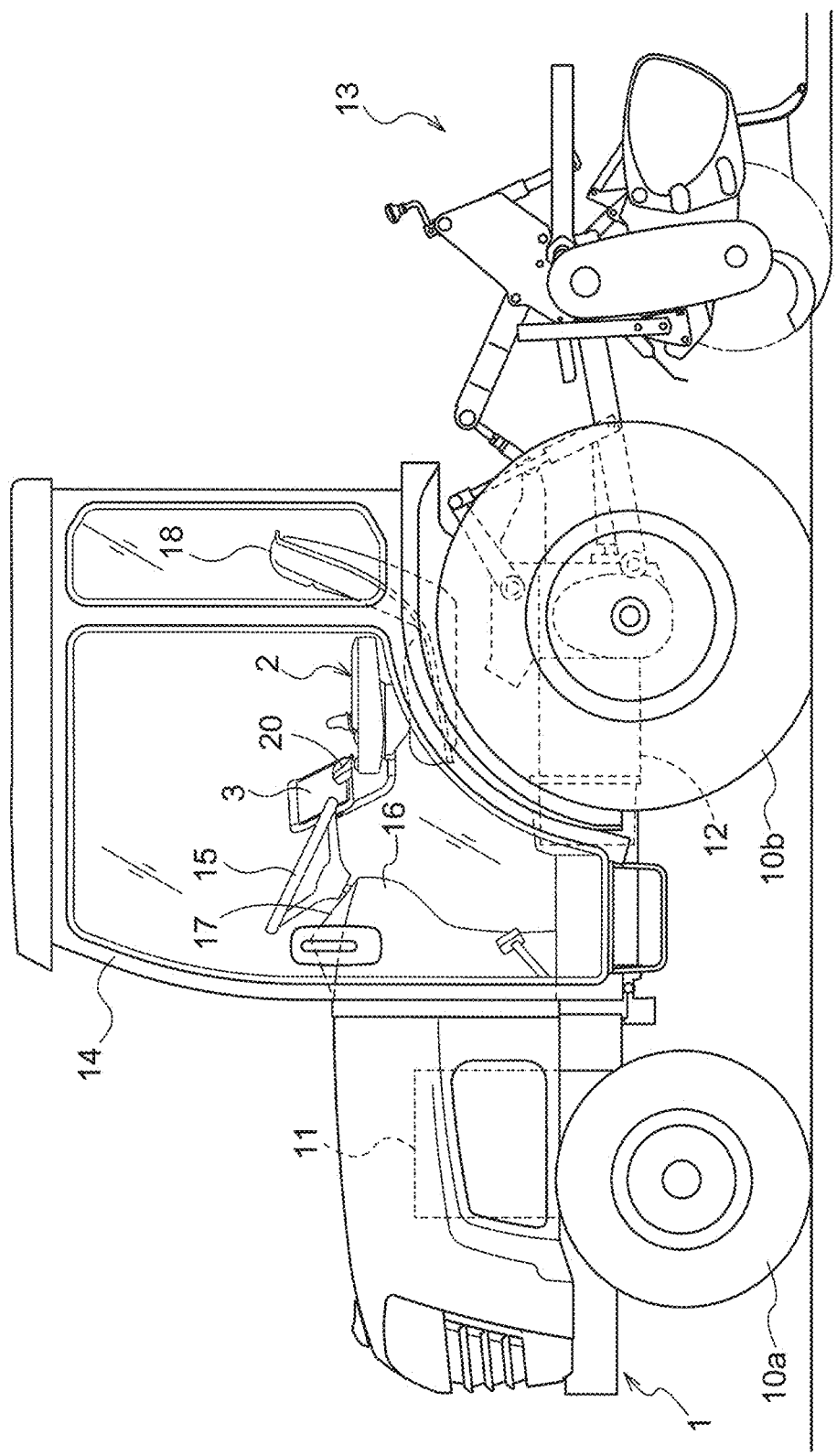
FIG. 2 is a side view of a tractor as an example of a work vehicle whose specification can be changed by the work vehicle specification change system.

Here, the work vehicle WV is a tractor 1. As shown in FIG. 2, the tractor 1 includes an engine 11 installed at a front portion of the vehicle body that is supported by front wheels 10a and rear wheels 10b, and a transmission 12 installed rearward of the engine 11. A rotary cultivator device serving as a work device 13 is installed rearward of the vehicle body so as to be raised and lowered via a link mechanism. The tractor 1 is a four-wheel-drive type, and the power of the engine 11 is transmitted to the front wheels 10a and the rear wheels 10b via a traveling transmission mechanism installed inside the transmission 12. Furthermore, the power of the engine 11 is also transmitted to the work device 13 from the transmission 12. A cabin 14 is disposed above the transmission 12.

The interior of the cabin 14 functions as a driving space, and a steering handle 15 to steer the front wheels 10a is supported by a handle post 16 at a front portion of the cabin 14. A meter panel 17 is provided on an upper surface of the handle post 16. A driver's seat 18 is disposed rearward of the steering handle 15. An armrest operation device 2 including a multifunctional operation tool 20 (corresponding to an "operation tool") is provided extending forward from the side of the driver's seat 18. A user interface-equipped terminal (hereinafter abbreviated as a "UI terminal") 3 is provided forward of the armrest operation device 2 as an operation device MD. In this preferred embodiment, the UI terminal 3 is a tablet computer including a touch panel 31 (see FIG. 4), and can visually notify the driver of various types of information and receive an operation command provided by the driver. User interface modes including a display mode of the meter panel 17 and a display mode of the UI terminal 3 can be changed with the specification update information. The UI terminal 3 may be a general-purpose product, or may be a dedicated customized product.

Figure 3:
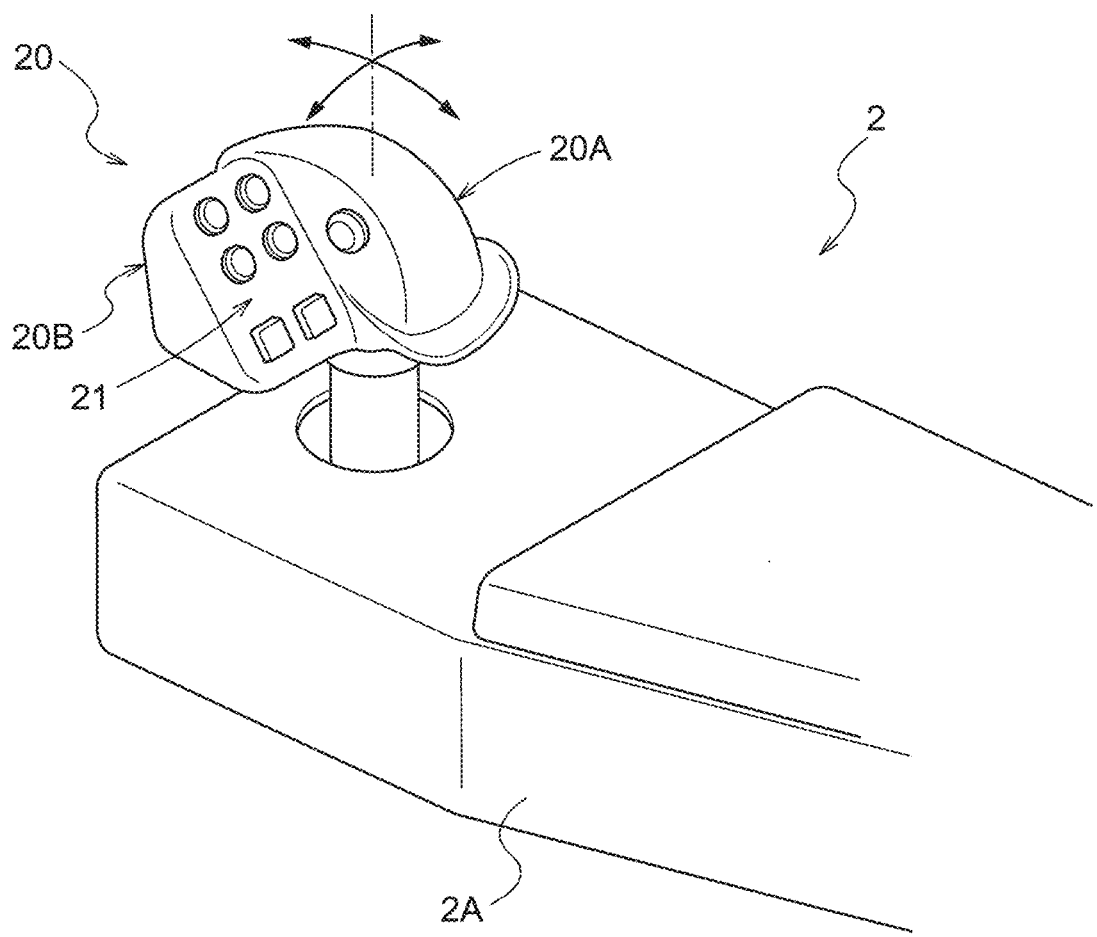
FIG. 3 is a perspective view of an armrest operation device including a multifunctional operation tool installed in the tractor.

FIG. 3 shows a joystick multifunctional operation tool 20 that is swingably supported by an armrest stand 2A constituting a component of the armrest operation device 2, which is an example of equipment operation device. The multifunctional operation tool 20 can be operated in various changeable operation patterns, and is used to adjust the traveling speed and the work speed. The multifunctional operation tool 20 includes a grip portion 20A, and an extension portion 20B protruding from the left side of the grip portion 20A. An operation switch group 21 is disposed on the extension portion 20B. The operation switch group 21 includes a travel operation switch group to change the shift speed of the transmission 12, and a work operation switch group to control the operation of the work device 13. The operations (operation patterns) realized according to the swinging direction (operating direction) of the multifunctional operation tool 20, and the operations realized by operating the switches of the operation switch group 21 can be changed with the specification update information.

Here, the armrest operation device 2, the UI terminal 3, the work device 13, the engine 11, the transmission 12, the meter panel 17 and so forth are treated as the in-vehicle devices VD of the tractor 1, and the specifications thereof can be changed.

Figure 4:
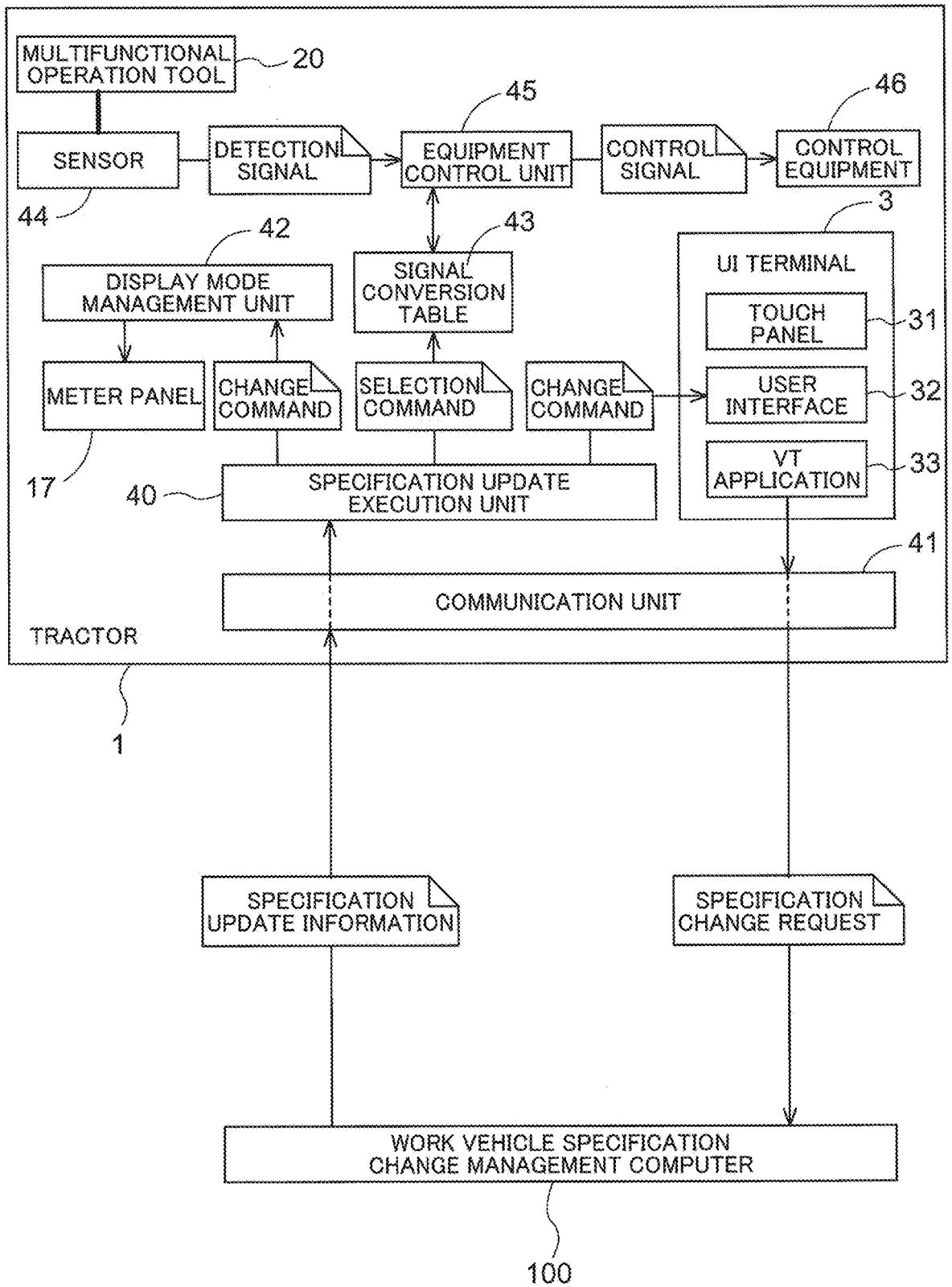
FIG. 4 is a functional block diagram showing functional units relating to specification change of the tractor.

Next, functional units and a flow of data relating to specification change of the tractor 1 will be described with reference to FIG. 4. The functional units relating to specification change of the tractor 1 include a specification update execution unit 40, a communication unit 41, a display mode management unit 42, a signal conversion table 43, and an equipment control unit 45 of an equipment operation device, and these units are included in a control unit of the tractor 1.

A detection signal that is output from a sensor 44 is input to the equipment control unit 45 as an operation signal. The detection signal indicates a movement of the multifunctional operation tool 20, and a switching state of the operation switch group 21. In response to the input detection signal, the equipment control unit 45 supplies a control signal to the corresponding control equipment 46 such as hydraulic equipment or a motor, and controls the movement of the control equipment 46. A plurality types (a plurality of modes) of signal conversion relationships between the detection signal and the control signal, or in other words, signal conversion relationships between the movement of the control equipment 46 and the movement of the multifunctional operation tool 20 or the switching of the operation switch group 21 are provided, and the signal conversion relationships are selectably stored in the signal conversion table 43. The equipment control unit 45 outputs, based on the control relationship (signal conversion relationship) selected from the signal conversion table 43, the control signal corresponding to the input detection signal. Accordingly, a selection command based on the specification update information received by the specification update execution unit 40 is supplied to the signal conversion table 43, whereby the signal conversion relationship used in the equipment control unit 45 is changed, and the specification of the multifunctional operation tool 20 is updated.

The display mode management unit 42 controls the display mode of the meter panel 17 that displays display items such as a travel distance, a number of revolutions of the engine, a vehicle speed, and the remaining fuel. The meter panel 17 includes a liquid crystal display region and a lamp region, and the display item displayed in the liquid crystal display region, the size and position of the display item, the display color, the lamp color in the lamp region, and so forth can be changed by changing the display mode of the meter panel 17. When the specification update information includes a change of the display mode of the meter panel 17, the specification update execution unit 40 sends a change command to the display mode management unit 42. Based on the change command, the display mode management unit 42 changes the display mode of the meter panel 17. Accordingly, the display specification of the meter panel 17 is updated.

The UI terminal 3 includes a touch panel 31, a user interface 32, and a VT application 33. The VT application 33 includes an application program for the UI terminal 3 to notify the driver of various types of information relating to the working travel of the tractor 1, an application program for the UI terminal 3 to assist the driver with an operation input, and an application program for the UI terminal 3 to create a specification change request. The user interface 32 has the function of changing the arrangement, the size, the color, and so forth of the information displayed on the touch panel 31. Therefore, when the specification update information includes a change of the user interface 32 of the UI terminal 3, the specification update execution unit 40 sends a change command to the user interface 32. Accordingly, the specification of the user interface 32 is updated, and the display state of the information on the touch panel 31 is changed.

The communication unit 41 is a data collection unit, also called a DCU, and is connected to an in-vehicle LAN of the tractor 1. The communication unit 41 is used for data exchange (a specification change request, specification update information, etc.) between a remotely located work vehicle specification change management computer 100 and the functional units of the tractor 1 and the UI terminal 3.

Next, a work vehicle specification change management computer 100 that is constructed as a cloud computing system will be described with reference to FIG. 5. The work vehicle specification change management computer 100 includes a database 56. The functional units of the work vehicle specification change management computer 100 relating to specification change include an input/output data processing unit 50, a specification change request processing unit 51, a specification update information generation unit 52, a user management unit 53, a specification information management unit 54, and a specification change limitation management unit 55.

The input/output data processing unit 50 is connected to a data communication line such as the Internet, and executes processing relating to input and output of various types of information. The input/output data processing unit 50 includes an information input unit 50a that receives a specification change request from the tractor 1, and the information output unit 50b that sends out, to the tractor 1, the specification update information generated by the specification update information generation unit 52.

The specification change request processing unit 51 generates specification change feature data from the specification change request received from the tractor 1 that is described in a free text format. Such a specification change request in a free text format includes a colloquial language, and sensuous terms or phrases, rather than a list of formatted terms or phrases such as predetermined keywords. Therefore, it is necessary to use a natural language processing technique to understand the main points of the specification change request, and create data to characterize the specification change. For this reason, the specification change request processing unit 51 includes a natural language processing module 511.

The specification update information generation unit 52 generates at least one specification update parameter from the specification change feature data generated by the specification change request processing unit 51, and further creates, from the specification update parameter, an update program that can be executed in the tractor 1 as specification update information. This preferred embodiment includes a specification update parameter generation module 521 in order to generate, from the specification change feature data, a specification update parameter group including a plurality of specification update parameters, using AI technology. The specification update parameter generation module 521 is a machine learning model that uses a neural network such as deep learning, and outputs a specification update parameter group, using the specification change feature data as an input. Furthermore, this preferred embodiment also includes an update programming module 522 that creates an update program, using the specification update parameter group.

In this preferred embodiment, the specification change request processing unit 51 and the specification update information generation unit 52 operate in cooperation with each other to finally create, from the specification change request, the update program as the specification update information. Therefore, the specification change request processing unit 51 may be incorporated in the specification update information generation unit 52 so as to be integrated into a single unit with the specification update information generation unit 52.

The database 56 includes a user information storage unit 561, a model-specific specification information storage unit 562, a specification update history storage unit (specification update history database) 563, and a specification change limitation information storage unit 564. The user information storage unit 561 stores user information relating to a driver (user) of the tractor 1, information of the work vehicle WV owned by the user, information of work performed by the user using the work vehicle WV, and so forth. The user information is managed by the user management unit 53, using a user identification code. The model-specific specification information storage unit 562 stores, as specification information, specification data of all models of work vehicles to which the work vehicle specification change system is to be used, and data relating to specification change. The specification information is managed by the specification information management unit 54 so as to be linked to a work vehicle identification code and the like. The specification update history storage unit 563 stores, on a work vehicle-by-work vehicle basis and on a user-by-user basis, update history data indicating a transition process (from a pre-update specification to an updated specification) of a specification in specification change performed by the user in the past. The update history data is managed by the user management unit 53 so as to be linked to the user identification code and the work vehicle identification code.

Note that there is an enormous amount of model-specific specification information, and the specification information relating to the specification change request is included in the model-specific specification information. Therefore, the specification information management unit 54 manages specification information as segmented specification data obtained by segmenting the specification information. The specification information management unit 54 can supply appropriate segmented specification data as the specification information by receiving, from the specification change request processing unit 51, a segmented specification request indicating a region to be subjected to specification change.

The specification change limitation information storage unit 564 stores a specification change limitation indicating limitation on specification change. The specification change limitation includes design limitations imposed taking a safety factor into account and prohibitions prescribed by the national and local governments. By applying the specification change limitation as a limiting condition to generate the specification update information, specification change that conflicts with the laws and regulations or rules in force on the site where the tractor 1 is used is prohibited. The specification change limitation is divided into limitations applied commonly in all regions, and limitations applied in a specific region, and these limitations are managed separately. As long as the current location of the tractor 1 is managed by the user management unit 53, when the tractor 1 is brought into, for example, a foreign country for use, it is also possible to send an update program by which specifications that have been allowed domestically are automatically prohibited, and are forcefully changed to specifications that are allowed in the foreign country. The specification change limitation is managed by the specification change limitation management unit 55 so as to be linked to the user identification code and the work vehicle identification code. Since the laws and regulations prescribed by the local or national governments can be revised at any time as needed, the specification change limitation management unit 55 accesses a server in which revisions of the laws and regulations are recorded, or a public information server of the manufacturer of the work vehicle, constantly updates the content of the specification change limitation information storage unit 564, and manages the specification change limitation as information for each local government, each country, or each region.

Figure 6:
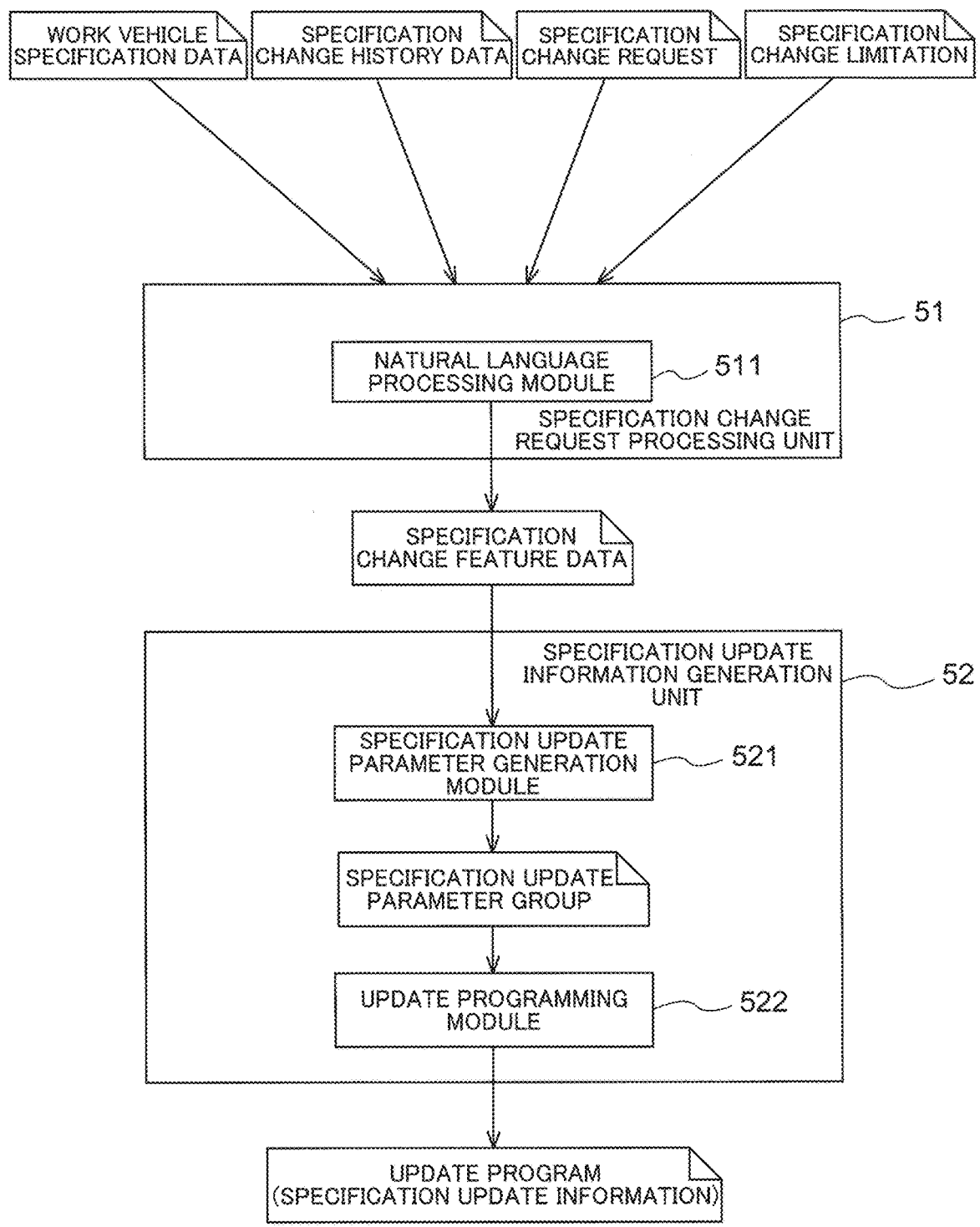
FIG. 6 is a schematic diagram showing a flow of data until specification update information is generated from a specification change request.

Next, the processing performed in the specification change request processing unit 51 and the specification update information generation unit 52 will be described more specifically with reference to FIG. 6. In this preferred embodiment, the natural language processing module 511 included in the specification change request processing unit 51 has two functions. The first function is a function of replacing a specification change request described in a free text format by a specification change request for which appropriate technical terms or phrases are used. This function is realized by analyzing the content of the specification change request described in a free text format by using a text analysis technique or a natural language processing technique, extracting important terms or phrases, and replacing the extracted important terms or phrases by technical terms or phrases. The other function is a function of also processing, as input data, work vehicle specification data, specification change history data, and the specification change limitations, in addition to the specification change request for which appropriate technical terms or phrases are used, and generating specification change feature data. At this time, the work vehicle identification code to identify the tractor 1 that is to be subjected to specification change, the user identification code to identify the driver (user) of the tractor 1, and the map position of the work site of the tractor 1 are also taken into account. Not only the content of the specification change, but also the work vehicle identification code to identify the tractor 1 that is to be subjected to the specification change, the user identification code to identify the driver (user) of the tractor 1, the map position of the work site of the tractor 1, and the like are attached to the specification change request. The work vehicle specification data, the specification change history data, and the specification change limitation can be read out from the database 56.

The specification change feature data that has been output from the specification change request processing unit 51 is input to the specification update parameter generation module 521 of the specification update information generation unit 52. The specification update parameter group that has been output from the specification update parameter generation module 521 includes various specification change parameters for the display mode management unit 42, the signal conversion table 43, the UI terminal 3, the user interface 32, and so forth that are to be subjected to specification update. Using the specification update parameter group, the update programming module 522 creates an update program that can be executed by the specification update execution unit 40 of the tractor 1. The update program is transmitted from the information output unit 50b to the tractor 1 as the specification update information.

With the configuration as described above, a specification change request can be easily generated, and specification update information can be easily generated from the specification change request. As a result, the content of the specification of the work vehicle WV can be easily changed to match a feeling of the driver as closely as possible.

Alternative Preferred Embodiments

Figure 7:
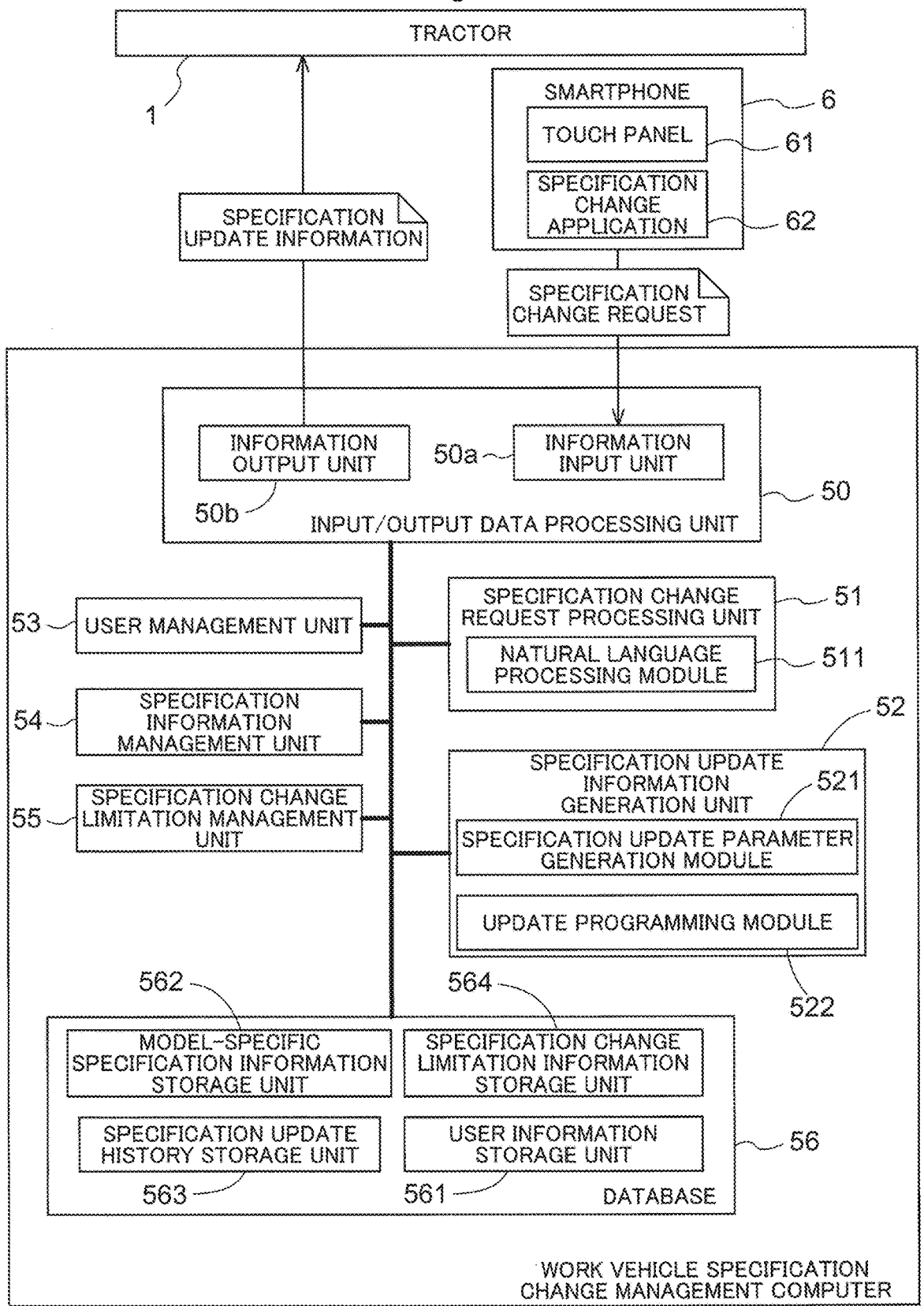
FIG. 7 is a functional block diagram of a work vehicle specification change system using a smartphone.

FIG. 7 shows a work vehicle specification change system in which a smartphone 6 serving as a portable terminal is used as the operation device MD in place of the UI terminal 3. The smartphone 6 is carried by the driver of the tractor 1, or is attached to the tractor 1. To request specification change, the driver starts a specification change application 62 of the smartphone 6, and creates a specification change request via a specification change request creation screen displayed on a touch panel 61. The created specification change request is transmitted to the work vehicle specification change management computer 100, using the communication function of the smartphone 6. The specification update information generated in the work vehicle specification change management computer 100 is supplied to the specification update execution unit 40 (see FIG. 4) of the tractor 1 via data communication between the information output unit 50b of the work vehicle specification change management computer 100 and the communication unit 41 (see FIG. 4) of the tractor 1. According to this preferred embodiment, a specification change request for a tractor 1 can be created even from a location far away from the tractor 1.

Figure 5:
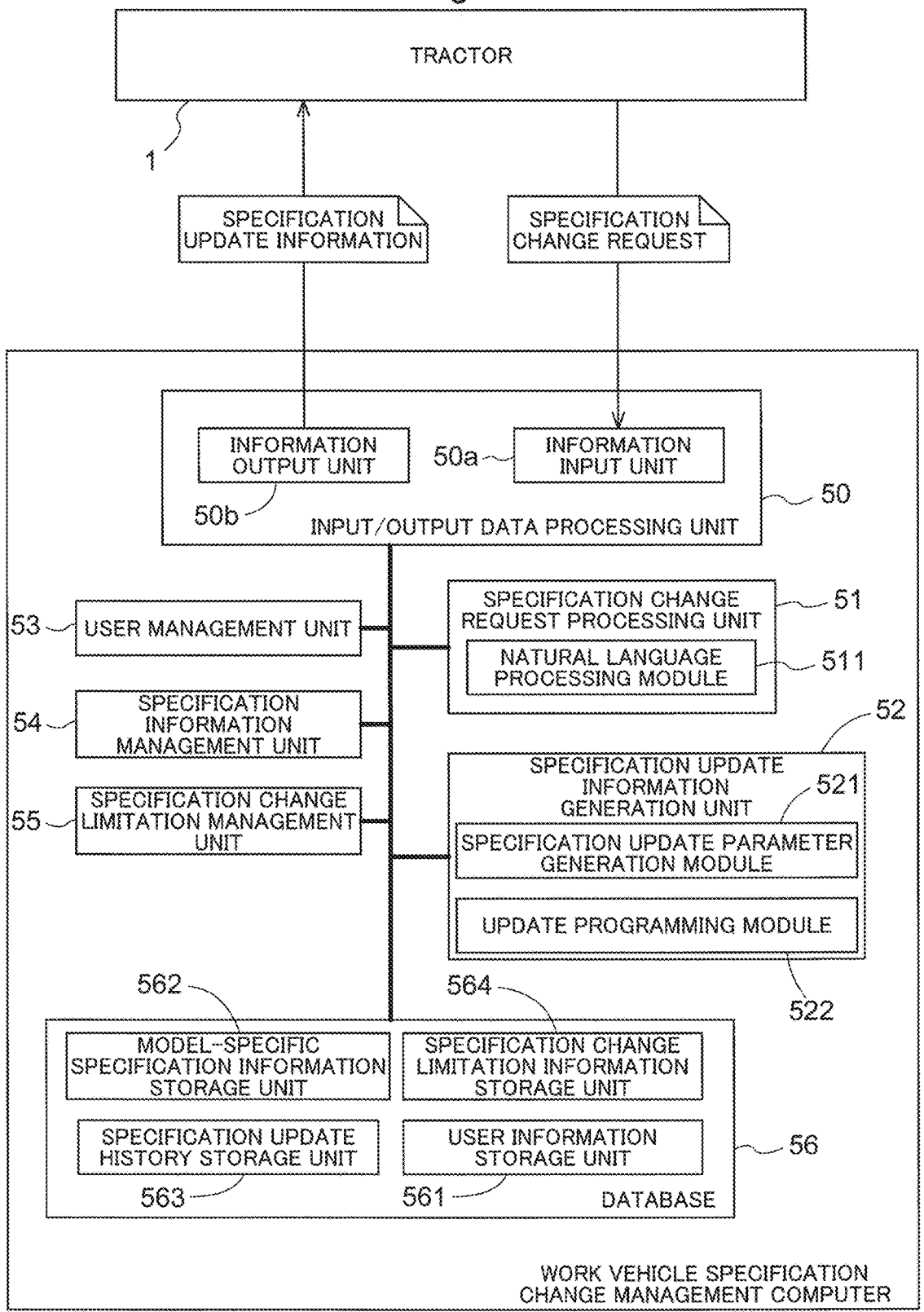
FIG. 5 is a functional block diagram showing functional units relating to specification change that are constructed in a work vehicle specification change management computer.
Figure 8:
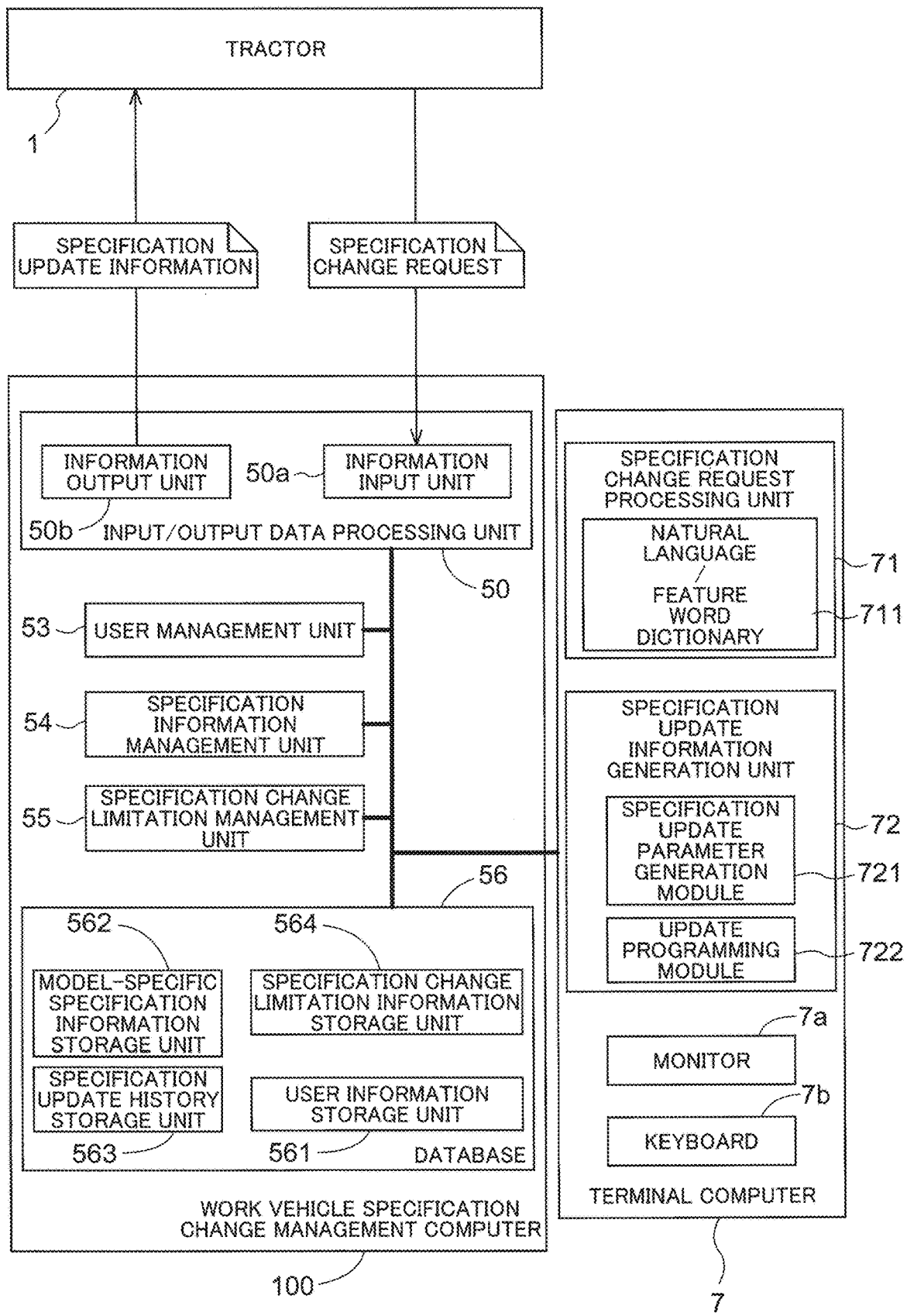
FIG. 8 is a functional block diagram showing an alternative preferred embodiment of the work vehicle specification change system.

FIG. 8 shows a work vehicle specification change system in which the processing, shown in FIG. 5 and so forth, performed in the specification change request processing unit 51 and the specification update information generation unit 52 is performed with the aid of an expert. In this preferred embodiment, the specification change request processing unit 51 and the specification update information generation unit 52 are excluded from the work vehicle specification change management computer 100, and are included in a terminal computer 7 that is connected to the work vehicle specification change management computer 100 via a communication line. The terminal computer 7 includes a specification change request processing unit 71 and a specification update information generation unit 72 that have functions similar to those of the specification change request processing unit 51 and the specification update information generation unit 52. The specification change request processing unit 71 included in the terminal computer 7 is configured to create specification change feature data from a specification change request described in a free text format, using feature terms or phrases selected by an expert. Specifically, the expert reads the specification change request using a monitor 7a and a keyboard (including, a mouse and a pad) 7b, and understands the meanings of the terms or phrases described in the specification change request with reference to a natural language/feature word dictionary 711, and selects the corresponding feature terms or phrases. The natural language/feature word dictionary 711 is configured as a term or a phrase database in which request terms or phrases used in formatted specification change requests and feature terms or phrases used in the specification change feature data are associated with each other. Although not shown, it is possible to adopt a configuration in which a comparison dictionary in which general terms or phrases are compared with accurate technical terms or phrases, and a collection of specification change examples in which many specification change examples linked to technical terms or phrases are collected have been compiled into a database, and the database is linked to the natural language/feature word dictionary 711.

The expert reads out, from the database 56, the specification data, the specification change history data, and the specification change limitation of an in-vehicle device VD that is to be subjected to specification update, studies these pieces of data, and creates final specification change feature data, using the feature terms or phrases. The specification change feature data is supplied to the specification update information generation unit 72. The specification update information generation unit 72 has substantially the same configuration as the specification update information generation unit 52 constructed in the work vehicle specification change management computer 100 in the above-described preferred embodiment, and therefore may be included in the work vehicle specification change management computer 100. The specification change feature data supplied to the specification update information generation unit 72 is input to a specification update parameter generation module 721. Consequently, the specification update parameter generation module 721 outputs a specification update parameter group. Furthermore, as a result of the specification update parameter group being input to an update programming module 722, the update programming module 722 generates an update program as the specification update information. As a modification of this preferred embodiment, it is possible to adopt a configuration in which the function of the specification update parameter generation module 721 of the specification update information generation unit 52 may be fulfilled by an expert using, for example, a collection of specification change examples compiled into a database.

The functional units shown in the functional block diagrams of FIGS. 4 to 8 each may be combined with another functional unit, or each of the functional units may be separated into a plurality of functional units. The above-described work vehicle specification change may be implemented by the work vehicle specification change system of each of the above preferred embodiments, or may be implemented as a work vehicle specification change method using any given device configuration. The work vehicle specification change may be implemented by a work vehicle specification change program. In this case, the program is stored in a storage device installed in the work vehicle specification change management computer 100, or any given storage device, and is executed by a processor such as a CPU installed in the work vehicle specification change management computer 100 or the like.

Note that the configurations disclosed in the preferred embodiments described above (including the alternative preferred embodiments, the same applies to the following) are applicable in combination with configurations disclosed in other preferred embodiments so long as no inconsistency arises.

The preferred embodiments disclosed herein are illustrative, and preferred embodiments of the present invention are not limited thereto. Appropriate changes and modifications may be made without departing from the scope and sprit of the present invention.

Preferred embodiments of the present invention and modifications and alterations thereto are applicable to agricultural machines other than a tractor, such as a rice planter and a combine, as well as work vehicles such as a civil engineering machine and a construction machine.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A work vehicle specification change system comprising:
   an in-vehicle device of a work vehicle;
   an information input to receive a specification change request in a free text format to change a specification of the in-vehicle device of the work vehicle, the specification change request being sent from an operation device on which an input operation is performed by a user driving the work vehicle;
   a specification update information generator configured to generate specification update information, based on the specification change request; and
   an information output to transmit the specification update information to the work vehicle; wherein
   the in-vehicle device includes:
      a multifunctional operation tool to be operated by the user; and
      an equipment operation device including an equipment controller to, based on an operation signal generated through operation of the multifunctional operation tool, generate a control signal to control equipment of the work vehicle; and
   a plurality of signal conversion relationships between the operation signal and the control signal are stored in a signal conversion table, and by providing the specification update information, a signal conversion relationship used in the equipment operation device is changed and a specification of the multifunctional operation tool is changed.

2. The work vehicle specification change system according to claim 1, further comprising:
   a specification change limitation manager to manage a specification change limitation indicating limitation on a specification change of the in-vehicle device; wherein
   the specification update information generator is configured or programmed to generate the specification update information, using the specification change limitation as a limitation.

3. The work vehicle specification change system according to claim 1, further comprising:

a specification change request processor to create specification change feature data, using a feature term or phrase selected from the specification change request by an expert; wherein
the specification update information generator is configured or programmed to generate the specification update information, based on the specification change feature data.

4. The work vehicle specification change system according to claim 3, further comprising:
   a term or phrase database including a request term or phrase used in the specification change request and the feature term or phrase used in the specification change feature data that are associated with each other; wherein
   the feature term or phrase is selected from the specification change request with reference to the term or phrase database.

5. The work vehicle specification change system according to claim 1, further comprising:
   a specification change request processor to generate specification change feature data from the specification change request; wherein
   the specification update information generator is configured or programmed to generate the specification update information based on the specification change feature data.

6. The work vehicle specification change system according to claim 5, wherein the specification change request processor is configured or programmed to include a natural language processing module that has been machine-learned to output the specification change feature data in response to the specification change request being input.

7. The work vehicle specification change system according to claim 5, wherein the specification update information generator is configured or programmed to include a specification update parameter generation module that has been machine-learned to output a specification update parameter serving as the specification update information in response to the specification change feature data being input.

8. The work vehicle specification change system according to claim 7, further comprising:
   a specification information manager to manage segmented specification data obtained by segmenting a changeable portion of the specification of the in-vehicle device; wherein
   the segmented specification data of the in-vehicle device that is to be subjected to specification update is used to generate the specification change feature data.

9. The work vehicle specification change system according to claim 7, further comprising:
   a specification update history database to store a specification update history of the user; wherein
   the specification update history of the user that has been extracted from the specification update history database is used to generate the specification change feature data.

10. The work vehicle specification change system according to claim 5, wherein the specification update information generator is configured or programmed to based on the specification change feature data:
   generate a specification update parameter group to define a specification update; and
   generate, from the specification update parameter group, an update program to change the specification of the in-vehicle device as the specification update information.

11. The work vehicle specification change system according to claim 1, wherein the specification update information generator is included in a cloud computing system capable of data communication with either or both of a controller of the work vehicle and a portable terminal of the user.

12. A work vehicle specification change method for changing a specification of an in-vehicle device of a work vehicle, the in-vehicle device including a multifunctional operation tool to be operated by a user, and an equipment operation device including an equipment controller to, based on an operation signal generated through operation of the multifunctional operation tool, generate a control signal to control equipment of the work vehicle, the method comprising:
- an information input step of receiving a specification change request in a free text format to change the specification of the in-vehicle device of the work vehicle, the specification change request being sent from an operation device on which an input operation is performed by the user driving the work vehicle;
- a specification update information generation step of generating specification update information, based on the specification change request in the free text format;
- an information output step of transmitting the specification update information to the work vehicle; and
- a step that by providing the specification update information to a signal conversion table in which a plurality of signal conversion relationships between the operation signal and the control signal are stored, a signal conversion relationship used in the equipment operation device is changed and a specification of the multifunctional operation tool is changed.

13. A non-transitory computer-readable medium for changing a specification of an in-vehicle device of a work vehicle, the in-vehicle device including a multifunctional operation tool to be operated by a user, and an equipment operation device including an equipment controller to, based on an operation signal generated through operation of the multifunctional operation tool, generate a control signal to control equipment of the work vehicle, the non-transitory computer-readable medium including a work vehicle specification change program configured to cause a computer to execute:
- an information input step of receiving a specification change request in a free text format to change the specification of then in-vehicle device of the work vehicle, the specification change request being sent from an operation device on which an input operation is performed by the user driving the work vehicle;
- a specification update information generation step of generating specification update information, based on the specification change request in the free text format;
- an information output step of transmitting the specification update information to the work vehicle; and
- a step that by providing the specification update information to a signal conversion table in which a plurality of signal conversion relationships between the operation signal and the control signal are stored, a signal conversion relationship used in the equipment operation device is changed and a specification of the multifunctional operation tool is changed.

* * * * *